United States Patent
Weng et al.

(10) Patent No.: US 7,626,813 B2
(45) Date of Patent: Dec. 1, 2009

(54) REMOVABLE HARD DISK MODULE

(75) Inventors: Mao-Huai Weng, Taipei Hsien (TW); Tsun-San Wang, Taipei Hsien (TW)

(73) Assignee: Acard Technology Corp., Sanchung, Taipei Hsien (TW)

( * ) Notice: Subject to any disclaimer, the term of this patent is extended or adjusted under 35 U.S.C. 154(b) by 156 days.

(21) Appl. No.: 12/018,305

(22) Filed: Jan. 23, 2008

(65) Prior Publication Data

US 2008/0298009 A1 Dec. 4, 2008

(30) Foreign Application Priority Data

May 31, 2007 (TW) .............................. 96119623 A

(51) Int. Cl.
*G06F 1/16* (2006.01)
(52) U.S. Cl. ............................. 361/679.37; 361/679.33; 361/679.39; 361/724; 361/727; 312/223.1; 312/223.2
(58) Field of Classification Search ............. 361/679.37
See application file for complete search history.

(56) References Cited

U.S. PATENT DOCUMENTS

| | | | | |
|---|---|---|---|---|
| 4,935,847 | A * | 6/1990 | Welsh | 361/801 |
| 6,471,310 | B2 * | 10/2002 | Montagna | 312/223.2 |
| 6,654,253 | B1 * | 11/2003 | DiMarco | 361/730 |
| 6,831,832 | B2 * | 12/2004 | Haager et al. | 361/679.39 |
| 7,019,965 | B2 * | 3/2006 | Bradley et al. | 361/679.38 |
| 7,055,701 | B2 * | 6/2006 | Dean et al. | 211/26 |
| 7,210,586 | B2 * | 5/2007 | Ice | 211/26 |
| 7,255,409 | B2 * | 8/2007 | Hu et al. | 312/334.4 |
| 7,301,756 | B2 * | 11/2007 | Wayman | 361/679.01 |
| 2002/0012237 | A1 * | 1/2002 | Dimarco | 361/796 |
| 2003/0223192 | A1 * | 12/2003 | Searby et al. | 361/683 |
| 2004/0031767 | A1 * | 2/2004 | Ice | 211/26 |
| 2005/0254210 | A1 * | 11/2005 | Grady et al. | 361/695 |
| 2005/0259390 | A1 * | 11/2005 | Wu et al. | 361/684 |
| 2005/0285492 | A1 * | 12/2005 | Hu et al. | 312/334.4 |

* cited by examiner

*Primary Examiner*—Jayprakash N Gandhi
*Assistant Examiner*—Anthony Q Edwards
(74) *Attorney, Agent, or Firm*—Volentine & Whitt, PLLC

(57) ABSTRACT

A removable hard disk module is provided which is mainly applicable to a server system. The removable hard disk module includes a server rack and a hard disk removable enclosure which is detachable form the server rack. The server rack has at least one pair of accommodation slots with threads formed on an inner wall thereof. The hard disk removable enclosure defines a space to accommodate a hard disk and has a threaded engagement portion disposed therein corresponding to the threads. When the hard disk removable enclosure is inserted into the accommodation slots, the threaded engagement portion is contacted with the threads, and the hard disk removable enclosure is moved alone to the threads through the threaded engagement portion, thereby the hard disk removable enclosure is moved into and fixed within the accommodation slots of the server rack.

12 Claims, 6 Drawing Sheets

REMOVABLE HARD DISK MODULE

FIELD OF THE INVENTION

The present invention relates to a removable hard disk module. More particularly, the present invention relates to a removable hard disk module applicable to a server system.

DESCRIPTION OF THE PRIOR ART

As a result of rapid progress in science and technology and increasingly high dependence on computer systems, the operation capability and data storage capability of the server system is highly required in the current market. As the space occupied by the server appliance cannot be immediately expanded, reducing the size of device, such as the host, has become a rapid and easy solution to enhance the storage capacity.

Generally, the server is installed on a server rack. The server rack has a plurality of accommodation slots disposed thereon to accommodating hard disk removable enclosures. The hard disk removable enclosures are used to accommodate hard disks. This is the way to manage common server hard disks. The conventional removable hard disk module is restricted by the width and height of the server rack, and the limited space above the rack usually cannot be fully utilized. For example, the width of a standard server rack is generally a little wider than four horizontally placed 3.5" hard disks. If a device for fixing the hard disk removable enclosure on the rack is disposed on the left and right sides of the hard disk removable enclosure, it is likely that merely 3 hard disks can be accommodated horizontally on the server rack. On the other hand, if the fixing device of the hard disk removable enclosure is designed to be disposed vertically, the thickness of the removable hard disk module is inevitably increased, and thus, the number of hard disks that can be installed vertically height direction is reduced.

In view of the above, manufactures all make a lot of efforts to design a device capable of stably fixing the removable enclosure within the server rack without influencing the size of the hard disk removable enclosure. FIG. 1 is a schematic view of a conventional removable hard disk module; FIG. 2 is a schematic view of a closed state of a fixing device for a conventional hard disk removable enclosure; and FIG. 3 is a schematic view of an open state of the fixing device for the conventional hard disk removable enclosure. As shown in FIGS. 1, 2, and 3, the conventional removable hard disk module 80 generally has a handle 82 disposed on the front surface of a hard disk removable enclosure 81. The handle 82 is associated and connected with a fastener 83. When the hard disk removable enclosure 81 is inserted into the server rack, the fastener 83 of the hard disk removable enclosure 81 is fastened with the inner wall (not shown) of the server rack, so as to fix the hard disk removable enclosure 81 within the server rack. If the hard disk removable enclosure 81 is to be withdrawn, the handle 82 is ejected pushing a release button 84, thereby the fastener 83 is released from the fastening relation with the server rack, and subsequently, the hard disk removable enclosure 81 is withdrawn upon pulling the handle 82. However, the fixing device for the conventional hard disk removable enclosure requires a lot of parts and components. Furthermore, since the hard disk removable enclosure is fixed through the fastening relation, the stroke range for fastening and releasing is rather small, and the manufacturing tolerance in the manufacturing process is also rather small. Once there is a significant error in the position of the fastener, the hard disk removable enclosure cannot be effectively fixed within the server rack.

Therefore, it is an urgent issue to propose a removable hard disk module that can stably fix the hard disk removable enclosure within the server rack, without causing any disadvantage described above and without wasting the server rack space.

SUMMARY OF THE INVENTION

The present invention is mainly directed to a removable hard disk module which is capable of effectively utilizing the space within the server rack and fixing a hard disk removable enclosure within a server rack through simple elements.

In order to achieve the above objective, the removable hard disk module of the present invention includes a server rack and a hard disk removable enclosure which is detachable from the server rack. The server rack has at least one pair of accommodation slots for accommodating the hard disk removable enclosure, and the accommodation slots are formed with threads on an inner wall thereof. The hard disk removable enclosure has one side plate on each side of the body and a front plate on the front. The two side plates and the front plate define a space to accommodate a hard disk. The front plate has a screw body pivotally disposed on one side thereof, and the screw body can be rotated and has a threaded engagement portion corresponding to the threads formed on the accommodation slots.

When the hard disk removable enclosure is inserted into the accommodation slots of the server rack, the threaded engagement portion is contacted with the threads. The screw body is then rotated so that the threaded engagement portion is moved along the threads, the hard disk removable enclosure is entirely moved into and fixed within the accommodation slots of the rack. If withdraw the hard disk removable enclosure is to be withdrawn from the accommodation slots, all it takes is to reversely rotate the screw body, so that the threaded engagement portion is moved outwards from the threads, until the threaded engagement portion is totally released from the fastening relation with the threads, that is, the hard disk removable enclosure can be directly withdrawn from the accommodation slots of the server rack.

DETAILED DESCRIPTION

Figure 1:
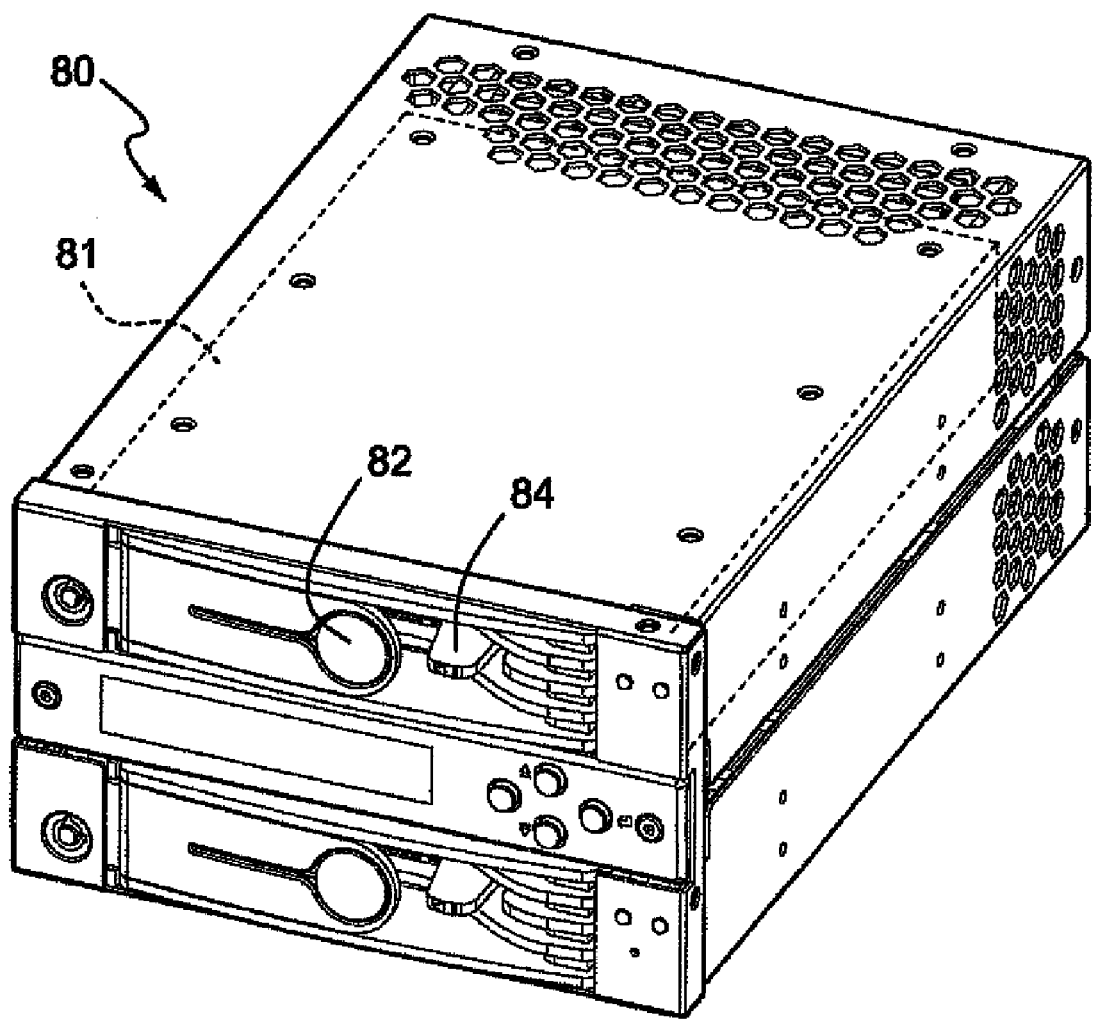
FIG. 1 is a schematic view of a conventional removable hard disk module.
Figure 2:
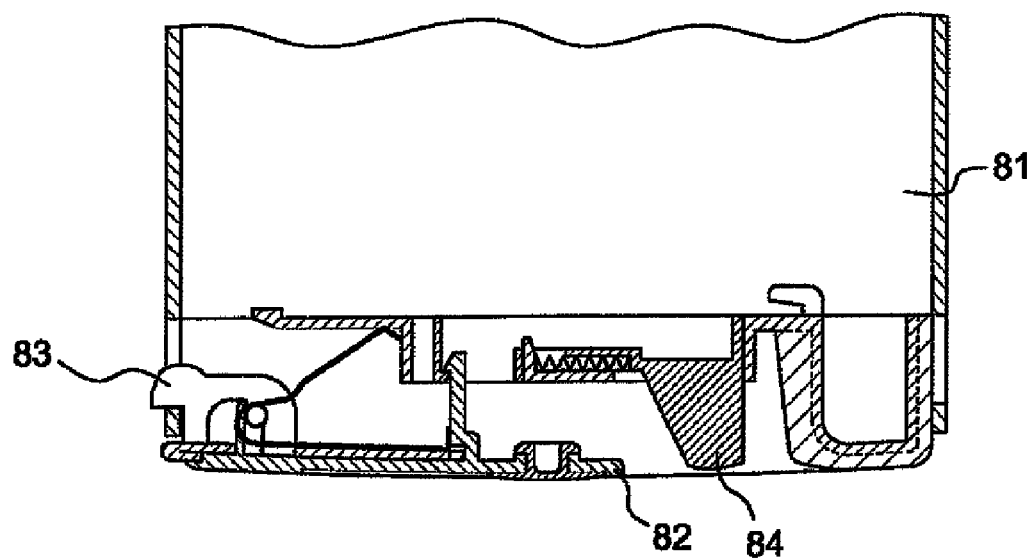
FIG. 2 is a schematic view of a closed state of a fixing device for the conventional hard disk removable enclosure.
Figure 3:
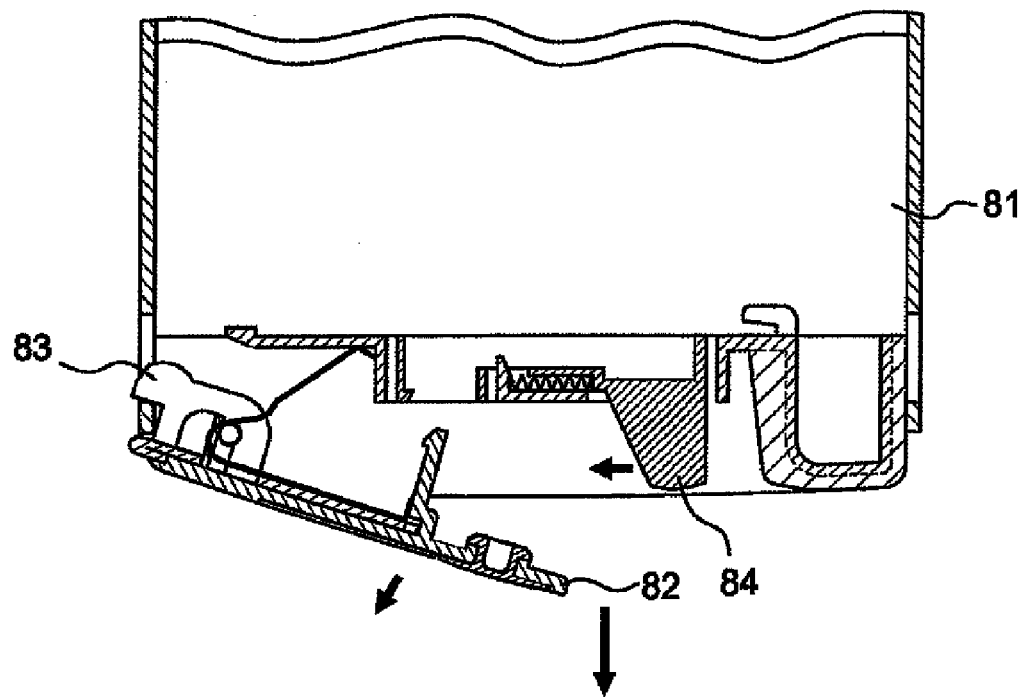
FIG. 3 is a schematic view of an open state of the fixing device for the conventional hard disk removable enclosure.

The preferred embodiment of the present invention is illustrated below with reference to the drawings, and the reference numerals are shown in the figures to indicate the corresponding elements.

Figure 4:
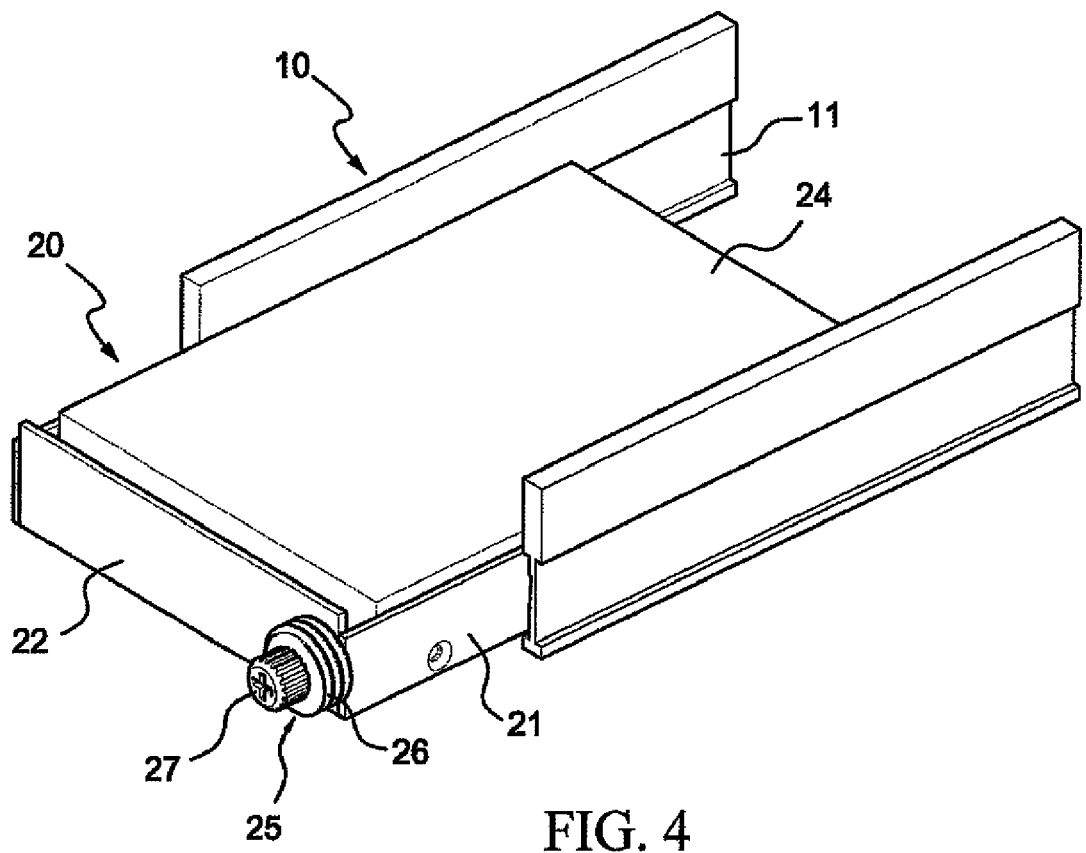
FIG. 4 is a schematic view of a hard disk removable enclosure partially inserted into a server rack according to a preferred embodiment of the present invention.
Figure 5:
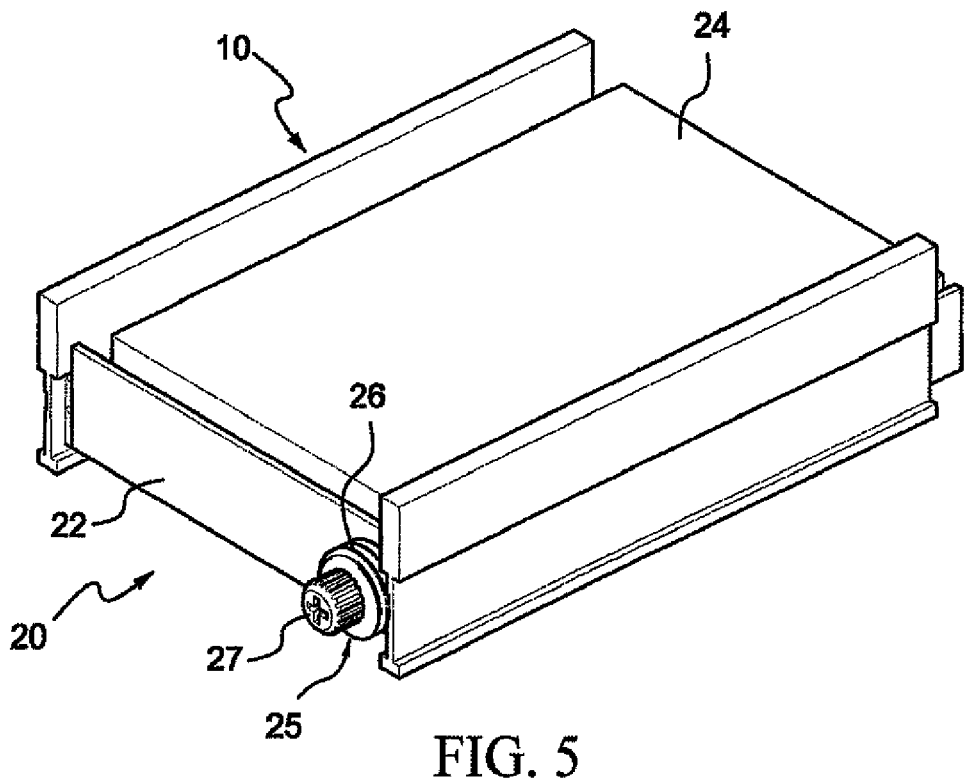
FIG. 5 is a schematic view of the hard disk removable enclosure entirely inserted into the server rack according to a preferred embodiment of the present invention.
Figure 6:
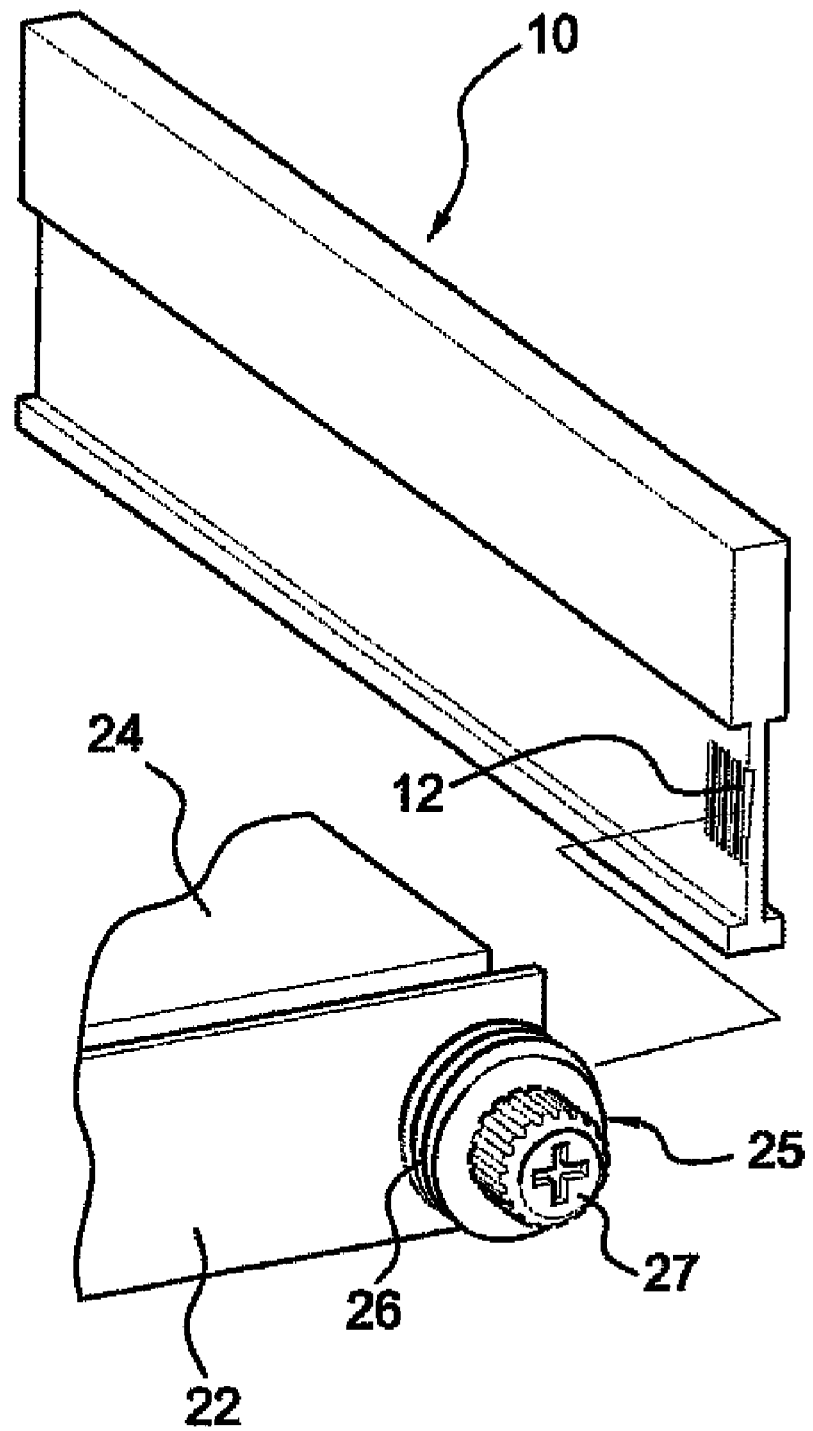
FIG. 6 is a partial structural schematic view of the hard disk removable enclosure and the server rack.
Figure 7:
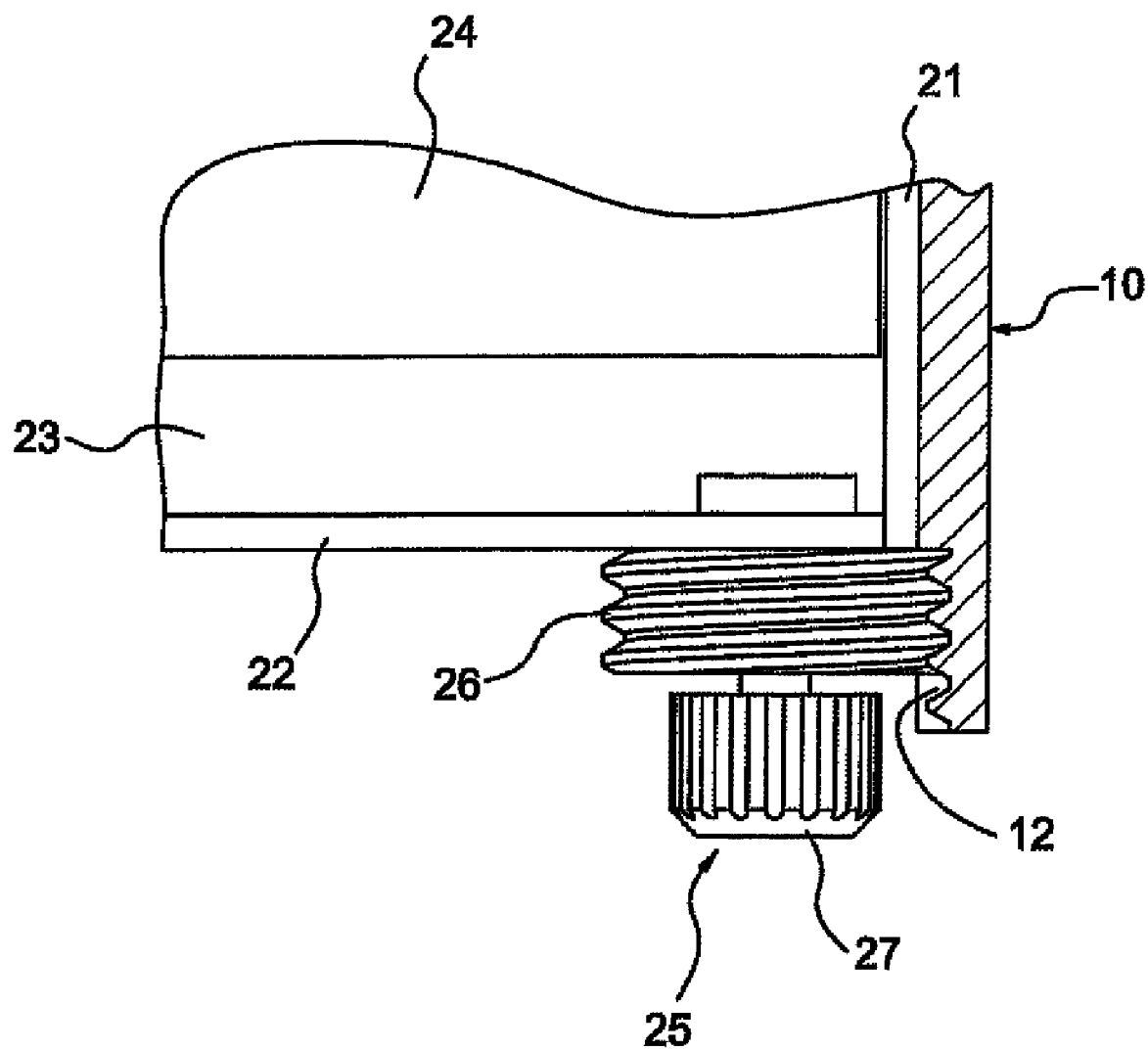
FIG. 7 is a partial sectional top view of the hard disk removable enclosure and the server rack.

FIG. 4 is a schematic view of a hard disk removable enclosure partially inserted into a server rack according to a preferred embodiment of the present invention; FIG. 5 is a schematic view of the hard disk removable enclosure entirely inserted into the server rack according to a preferred embodiment of the present invention; FIG. 6 is a partial structural schematic view of the hard disk removable enclosure and the server rack; and FIG. 7 is a partial sectional top view of the hard disk removable enclosure and the server rack. As shown in FIGS. 4, 5, 6, and 7, the removable hard disk module of the present invention mainly includes a server rack 10 and at least one hard disk removable enclosure 20. The so-called server rack herein refers to a rack for a computer server which has a plurality of hard disks accommodated therein and allows the plurality of hard disks to be connected in series thereby increasing the data storage capacity of the server, and enhancing the stability of the system. The server rack can be of various types, for example, 1 U server, 2 U server, 3 U server, and 4 U server. The so-called 1 U refers to the height of a standard lamination of 1.75 inches (about 4.5 cm), which is substantially the height of an optical disc drive. Similarly, 2 U is a height of 3.5 inches, and 3 U is a height of 5.25 inches, and so on. It should be noted that, the server rack of the present invention is not limited to a common server system as described above, but can also be a rack of a personal computer.

The server rack 10 includes at least one pair of accommodation slots 11, which are disposed in parallel and spaced apart with an interval them, and each pair of accommodation slots 11 can accommodate one hard disk removable enclosure 20. Generally, one 1 U server has 3 or 4 pairs of accommodation slots 11 to accommodate the hard disk removable enclosure 20; one 2 U server has 6 or 8 pairs of accommodation slots 11 to accommodate the hard disk removable enclosure 20, and so on. The accommodation slots 11 of the present invention have threads 12 formed on an inner wall thereof; the threads 12 can be screw threads (as shown in FIG. 7) or a plurality of parallel grooves (as shown in FIG. 6), or various other similar structures, such as a plurality of parallel openings.

The hard disk removable enclosure 20 of the present invention has one side plate 21 disposed on each side of the body thereof, and a front plate 22 disposed on the front surface. The two side plates 21 and the front plate 22 define a space 23 to accommodate the hard disk 24. Additionally, the side plates 21 and the front plate 22 can be individual element separated from each other or can be formed integrally. It is not necessary for the front plate 22 to completely cover the front surface of the hard disk removable enclosure 20; for example, the side plates 21 (or the front plate 22) can be designed as an L-shaped plate to respectively define the front surface and the side surface of the hard disk removable enclosure 20. The two side plates 21 are just glidingly combined into the pair of accommodation slots 11, so that the hard disk removable enclosure 20 can be glidingly inserted into or withdrawn from the server rack 10. A screw body 25 is rotatably disposed on one side of the front plate 22 and has a threaded engagement portion 26 and a rotary knob 27. The threaded engagement portion 26 is disposed on one side of the front plate 22 and slightly exceeds the edge, and can be rotated to or from the front plate 22. The threaded engagement portion 26 is cylindrical in shape and has screw threads on the surface thereof. The screw threads can be engaged with the threads 12 on the inner wall of the accommodation slots 11 of the server rack 10. The rotary knob 27 is fixed on the threaded engagement portion 26. The threaded engagement portion 26 is made to rotate by rotating the rotary knob 27 with hand or screw driver (not shown), and thus, the user can easily manipulate the screw body 25.

If the hard disk removable enclosure 20 is to be placed into the accommodation slots 11 of the server rack 10, the hard disk removable enclosure 20 is first inserted within the accommodation slots 11, so that the two side plates 21 are glidingly inserted into the two accommodation slots 11. After the treaded engagement portion 26 of the screw body 25 is contacted with the threads 12 on the inner wall of the accommodation slots 11, the screw body 25 is rotated, so as to make the threaded engagement portion 26 of the screw body 25 engaged with the threads 12 of the accommodation slots 11, and by means of rotating the threaded engagement portion 26, the threaded engagement portion 26 is moved towards the accommodation slots 11 of the server rack 10 along the threads 12, so as to drive the hard disk removable enclosure 20 to move inwards to the server rack 10, and thereby entirely screwing the hard disk removable enclosure 20 into the accommodation slots 11 of the server rack 10. Through the engagement relation between the threaded engagement portion 26 and the threads 12, the hard disk removable enclosure 20 is fixed within the accommodation slots 11 of the server rack 10.

On the other hand, if the hard disk removable enclosure 20 is to be withdrawn from the accommodation slots 11 of the server rack 10, the screw body 25 is reversely rotated firstly, such that the threaded engagement portion 26 is moved out of the accommodation slots 11 along the threads 12, thereby driving the hard disk removable enclosure 20 to move outwards from to the server rack 10, and when the threaded engagement portion 26 of the screw body 25 is released from the engagement relation with the threads 12 of the accommodation slots 11, the user can directly withdraw the hard disk removable enclosure 20 out of the accommodation slots 11 of the server rack 10.

Figure 8:
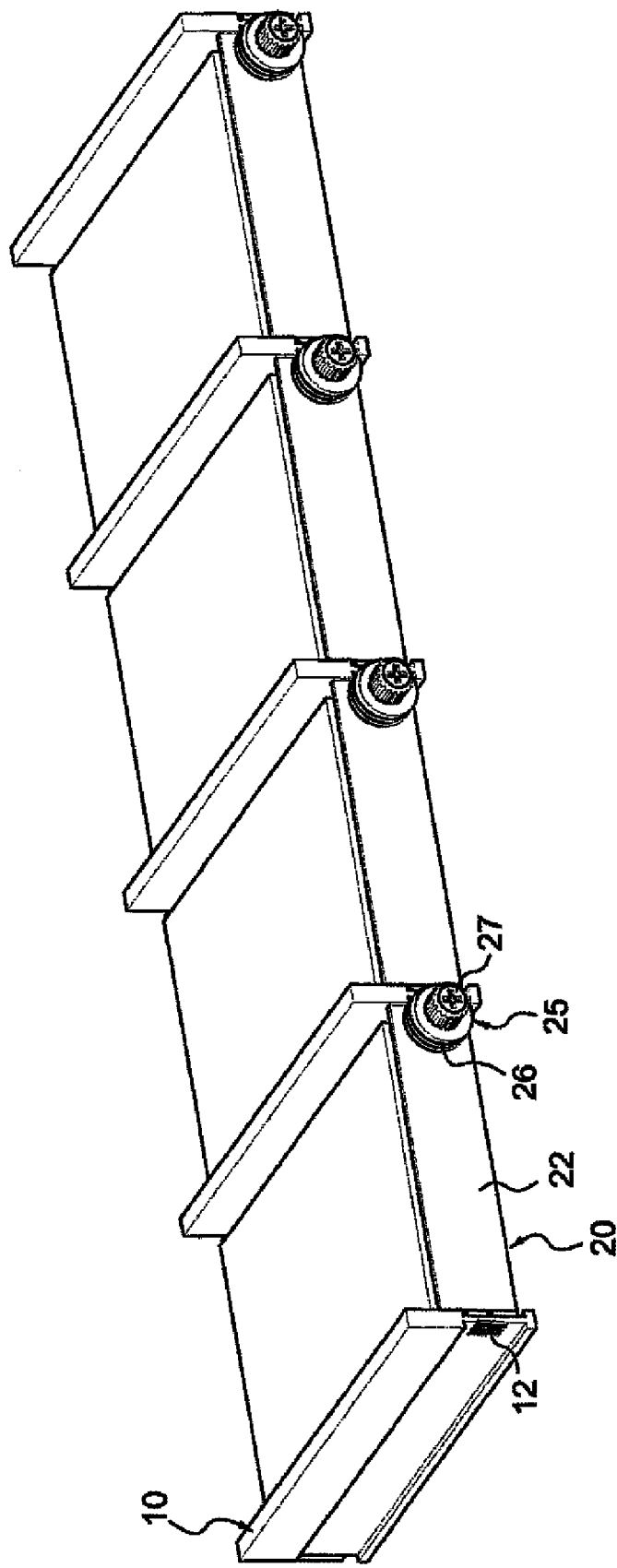
FIG. 8 is a schematic view of the removable hard disk module applied in a 1 U server according to a preferred embodiment of the present invention.

FIG. 8 is a schematic view of the removable hard disk module applied in a 1 U server according to a preferred embodiment of the present invention. As shown in FIG. 8, in the removable hard disk module of the present invention, as the space in the server rack 20 is not wasted width-wise, one 1 U server can horizontally accommodate 4 hard disk removable enclosures 10, that is, to accommodate four hard disks 24. Moreover, in the removable hard disk module of the present invention, as the space in the server rack 10 is not wasted height-wise, the number of hard disks 24 that can be installed vertucakkt is not influenced, and thus, a number of hard disks can be combined and disposed on the server rack in high density and in a space-saving way.

Additionally, the number of parts required in the present invention is much less than that of the conventional art, and as the hard disk removable enclosure is inserted and withdrawn through the engagement relation between the screw threaded engagement portion 26 and the threads 12, a relative large manufacturing tolerance can be achieved, compared with the conventional art.

Though the preferred embodiment of the present invention has been described herein, it is apparent to those skilled in the art that various modifications and variations can be made to the structure of the present invention without departing from the scope or spirits of the invention. In view of the foregoing, it is intended that the present invention covers modifications to and variations of this invention provided they fall within the scope of the following claims and their equivalents.

LISTS OF REFERENCE NUMERALS

10 Server Rack
11 Accommodation Slot
12 Thread
20, 81 Hard Disk Removable Enclosure
21 Side Plate
22 Front Plate
23 Space
24 Hard Disk
25 Screw Body
26 Threaded Engagement Portion
27 Rotary Knob
80 Removable hard disk module
82 Handle
83 Fastener
84 Release button

We claim:

1. A hard disk removable enclosure for accommodating a hard disk and capable of being inserted into a pair of accommodation slots of a rack, wherein the accommodation slots have threads disposed on an inner wall, the hard disk removable enclosure comprising:
    two side plates, disposed on two sides of the hard disk removable enclosure, that can be glidingly inserted into the accommodation slots;
    a front plate formed on a front surface of the hard disk removable enclosure to define a space together with the two side plates so as to accommodate the hard disk; and
    a screw body rotatably disposed on one end of the front plate, having an threaded engagement portion corresponding to the threads, wherein the threaded engagement portion is contacted and engaged with the threads by means of rotating the screw body, and through the rotation of the threaded engagement portion, the threaded engagement portion is moved along the threads, so that the hard disk removable enclosure is moved and fixed within the accommodation slots of the rack.

2. The hard disk removable enclosure as claimed in claim 1, wherein the screw body has a rotary knob disposed thereon to facilitate the rotation of the screw body.

3. The hard disk removable enclosure as claimed in claim 1, wherein the threads are screw threads that exactly match the threaded engagement portion.

4. The hard disk removable enclosure as claimed in claim 1, wherein the threads are parallel grooves that exactly match the threaded engagement portion.

5. The hard disk removable enclosure as claimed in claim 1, wherein the rack is a server rack.

6. The hard disk removable enclosure as claimed in claim 1, wherein the rack is a rack of a personal computer.

7. A removable hard disk module, comprising:
    a rack having at least one pair of accommodation slots with threads disposed on an inner wall thereof;
    a hard disk removable enclosure, having one side plate on each side and a front plate at the front, wherein the two side plates and the front plate define a space to accommodate a hard disk; the front plate has a screw body disposed on one side thereof, and the screw body is capable of being rotated to or from the front plate and has an threaded engagement portion corresponding to the threads; the threaded engagement portion is contacted and engaged with the threads by means of rotating the screw body, and the threaded engagement portion is moved along the threads through the rotation of the threaded engagement portion, thereby the hard disk removable enclosure is moved and fixed within the accommodation slots of the rack.

8. The removable hard disk module as claimed in claim 7, wherein the screw body has a rotary knob disposed thereon to facilitate the rotation of the screw body.

9. The removable hard disk module as claimed in claim 7, wherein the threads are screw threads that exactly match the threaded engagement portion.

10. The removable hard disk module as claimed in claim 7, wherein the threads are parallel grooves that exactly match the threaded engagement portion.

11. The removable hard disk module as claimed in claim 7, wherein the rack is a server rack.

12. The removable hard disk module as claimed in claim 7, wherein the rack is a rack of a personal computer.

* * * * *